(12) United States Patent
Ramsdell

(10) Patent No.: US 8,957,762 B2
(45) Date of Patent: *Feb. 17, 2015

(54) GEOGRAPHIC BASED REMOTE CONTROL

(71) Applicant: Scott Ramsdell, Charlotte, NC (US)

(72) Inventor: Scott Ramsdell, Charlotte, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,218

(22) Filed: Feb. 8, 2013

(65) Prior Publication Data

US 2013/0249678 A1 Sep. 26, 2013

Related U.S. Application Data

(63) Continuation of application No. 12/608,786, filed on Oct. 29, 2009, now Pat. No. 8,395,477.

(51) Int. Cl.

| | |
|---|---|
| G05B 19/00 | (2006.01) |
| B60R 25/10 | (2013.01) |
| H03K 17/94 | (2006.01) |
| G08B 5/00 | (2006.01) |
| G09B 3/00 | (2006.01) |
| G08C 19/00 | (2006.01) |
| G08C 17/02 | (2006.01) |
| H04L 29/06 | (2006.01) |

(52) U.S. Cl.
CPC ........... *G08C 19/00* (2013.01); *G08C 17/02* (2013.01); *H04L 63/08* (2013.01); *H04L 63/0884* (2013.01); *G08C 2201/41* (2013.01); *G08C 2201/42* (2013.01); *G08C 2201/61* (2013.01); *G08C 2201/91* (2013.01)

USPC ............. 340/5.8; 340/426.36; 340/815.6; 340/12.22; 340/4.3; 340/10.2; 434/351; 341/20; 341/173; 341/176; 348/734; 348/563

(58) Field of Classification Search
USPC ........................................... 340/5.8
See application file for complete search history.

(56) References Cited

U.S. PATENT DOCUMENTS

| | | | |
|---|---|---|---|
| 4,039,954 A | 8/1977 | den Toonder | |
| 6,842,774 B1 * | 1/2005 | Piccioni | 709/207 |
| 7,495,544 B2 * | 2/2009 | Stilp | 340/10.1 |
| 8,116,889 B2 * | 2/2012 | Krzyzanowski et al. | 700/90 |
| 8,145,124 B2 * | 3/2012 | Yassa | 455/3.04 |

(Continued)

*Primary Examiner* — Fekadeselassie Girma
(74) *Attorney, Agent, or Firm* — Straub & Pokotylo; Michael P. Straub; Stephen T. Straub

(57) ABSTRACT

An intermediary between a remote control device and a remotely controllable device implements identification and/or authentication. The intermediary is, e.g., a node or set of nodes within a head end of a cable network service provider. A remote control device at a customer premise sends a command intended to control a remotely controllably device which is also located at the same customer premise. The customer premise includes a network interface, e.g., a cable modem, which has associated identification information. The command and the associated network interface identification information are communicated to the intermediary, e.g., via a cable modem. The intermediary accesses a subscriber record corresponding to the location based on the network interface identification information. The intermediary identifies the device to be controlled, e.g., a particular set top box and/or authenticates the remote control device. A command is sent via the network to the device to be controlled.

19 Claims, 6 Drawing Sheets

(56) References Cited

U.S. PATENT DOCUMENTS

| | | | |
|---|---|---|---|
| 8,395,477 B2 * | 3/2013 | Ramsdell | 340/5.8 |
| 2005/0024227 A1 * | 2/2005 | Dunstan | 340/825.22 |
| 2005/0110651 A1 * | 5/2005 | Martis et al. | 340/825.69 |
| 2007/0290884 A1 * | 12/2007 | Ishimoto et al. | 340/825.72 |
| 2008/0271101 A1 * | 10/2008 | Doherty | 725/114 |

* cited by examiner

GEOGRAPHIC BASED REMOTE CONTROL

RELATED APPLICATIONS

The present application is a continuation of U.S. patent application Ser. No. 12/608,786 filed Oct. 29, 2009 which is hereby expressly incorporated by reference in its entirety.

FIELD

The present application relates to remotely controlling devices, and more particularly, to methods and apparatus in which an intermediary between a remote control device and a remotely controllable device implements identification and/or authentication.

BACKGROUND

The use and popularity of remote controls continues to expand, as many new devices typically tend to incorporate remotely controllable interfaces and features. Remote control of a device can allow for greater control flexibility and facilitate the implementation of expanded control command options. In addition, new services may be offered and selected via remote control devices. As the number of remote controls in the general population increases, questions related to remote control command identification and authentication become of concern.

In addition to the proliferation of remote controls, remotely controllable devices, and remotely controllable services, there also has been an increased use of localized wireless communication networks using standard common signaling protocols and using an access point, e.g. a local Wi-Fi network. Thus it would be beneficial if at least some remote controls included a wireless interface such as a Wi-Fi interface which is capable of communicating with a local access point and possibly be authorized to control multiple devices at a single site. However, many legacy devices already in the field, which are remotely controllable in at least some form, do not include an interface for communicating with such a local wireless access point, but may already include another interface, e.g., a cable network interface.

Service providers, e.g., cable providers, already have infrastructure in place coupling many locations, e.g., home sites, office sites, etc., to their secure service provider network. It would be beneficial if methods and apparatus were developed which enabled the secure service providers to facilitate remote control command identification and/or authentication.

SUMMARY

Various embodiments of the present invention relate to remotely controlling devices, and more particularly, to methods and apparatus in which an intermediary between a remote control device and a remotely controllable device implements identification and/or authentication. The intermediary implementing the exemplary method is, e.g., a node or set of nodes within a head end of a cable network service provider. A control device, e.g., a wireless remote control, at a customer premise sends a command intended to control a remotely controllable device which is also located at the same customer premise. The customer premise includes a network interface, e.g., a cable modem, which has associated identification information. The command and the associated network interface identification information are communicated to an intermediary device, e.g., an authentication and routing node in a head end. The intermediary device accesses a subscriber record corresponding to the location based on the network interface identification information. The intermediary device identifies the intended recipient of the device to be controlled, e.g., a particular set top box at the location from which the command was sent and/or authenticates that the control device which sent the command is authorized to command the intended recipient of the command. In some embodiments, the intermediary device may reformat the command or perform a protocol conversion on the command. Upon satisfaction of identification and/or authentication, the intermediary device sends the command to the intended recipient, which is located at the same site from which the command was initiated by the control device. The command may be sent via the communications network, e.g. cable network.

A control method, in accordance with one embodiment of the present invention comprises: receiving device control information via a network interface, located at a first location, and a communications network coupled to said network interface; identifying a device at said first location to be controlled; and sending a command to said identified device. In one example, the device control information includes a channel change command, the first location is a customer premise, the communications network is a cable network, and the identified device to be controlled is a first set top box. An exemplary apparatus, in accordance with one embodiment of the present invention, comprises: a module for receiving device control information via a network interface, located at a first location, and a communications network coupled to said network interface; a module for identifying a device at said first location to be controlled; and a module for sending a command to said identified device.

Numerous additional benefits, features and embodiments of the methods and apparatus of the present invention are described in the detailed description which follows.

DETAILED DESCRIPTION

Figure 1:
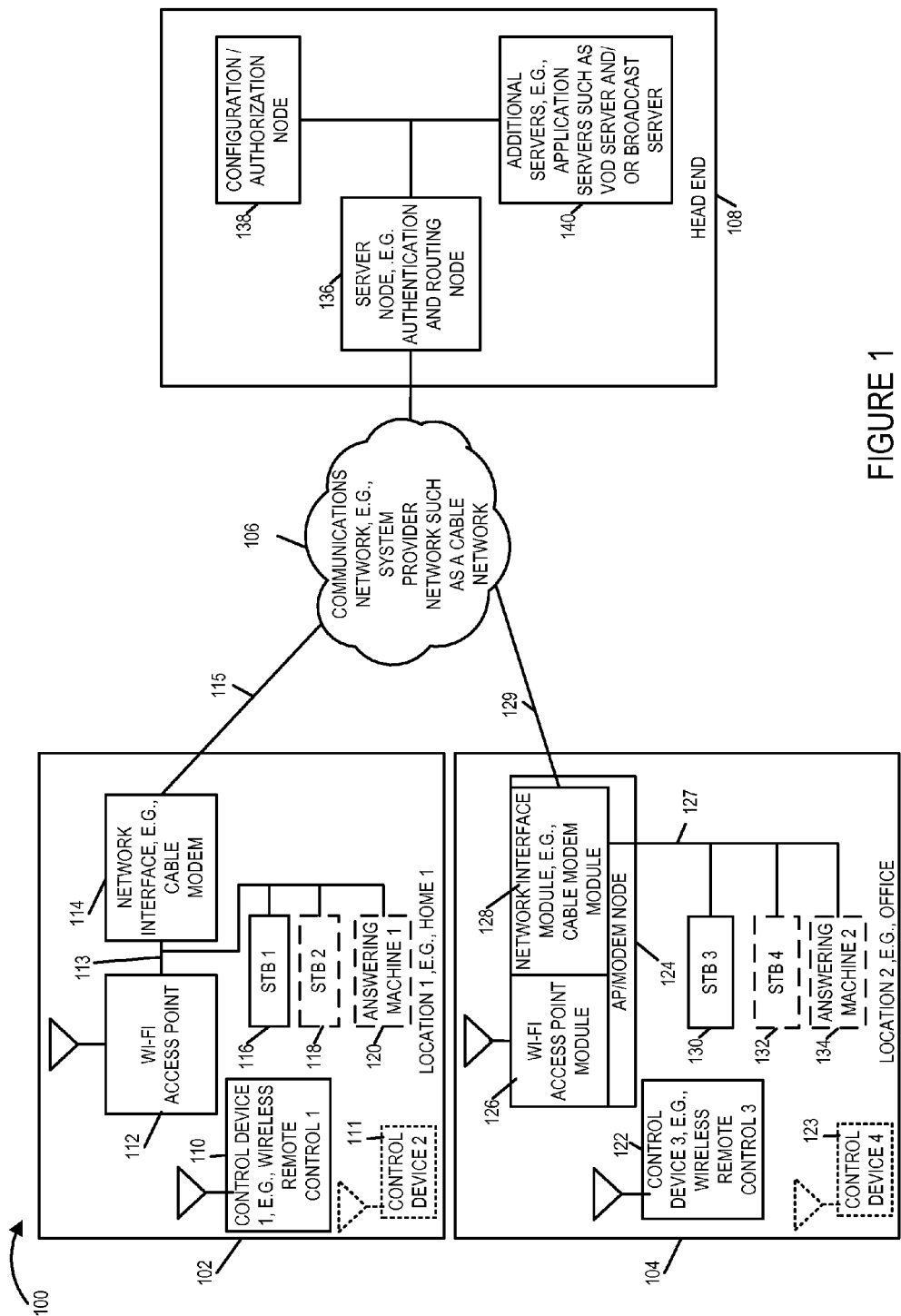
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a plurality of user premise sites situated at different geographic locations (location 1 102, location 2 104), a communications network 106 and a head end 108, which are coupled together. Location 1 102, e.g., home 1, includes control device 1 110, e.g., wireless remote control 1, WI-FI access point 112, network interface 114, e.g., a cable modem, and Set Top Box (STB) 1 116. In some embodiments, location 1 102 includes one or more additional controllable devices, e.g., STB 2 118 and answering machine 1 120. In various embodiments, location 1 102 includes additional control devices, e.g. control device 2 111. WI-FI access point 112 is coupled to network interface 114 via link 113. Control device 1 110 communicates with WI-FI access point 112 via a wireless link. Control device 2 111, when included, also communicates with WI-FI access point 112. A control device, e.g., control device 1 110 may send a command to WI-FI access point 112 to control operation of a controllable device, e.g., STB 1 116, STB 2 118, or answering machine 1 120.

Network interface 114, STB 1 116, STB 2 118, and answering machine 1 120 are coupled to network interface 114 via link 113. Network interface 114 is coupled to communications network 106 via link 115.

Location 2 104, e.g., an office, includes control device 3 122, e.g., wireless remote control 3, an access point/modem node 124 and STB 3 130. In some embodiments location 2 104 includes one or more additional controllable devices, e.g., STB 4 132, and answering machine 2 134. In various embodiments location 2 104 includes one or more additional control devices, e.g., control device 4 123. Access point/modem node 124 includes a WI-FI access point module 126 and a network interface module 128, e.g., a cable modem module. WI-FI access point module 126 is internally coupled to network interface module 128 within node 124. Control device 3 122 communicates with WI-FI access point module 126 via a wireless link. Control device 4 123, when included, also communicates with WI-FI access point module 126 via a wireless link. A control device, e.g., control device 3 122 may send a command to WI-FI access point 126 to control operation of a controllable device, e.g., STB 3 130, STB 4 132, or answering machine 2 134. The network interface module 128 is coupled to STB 3 130, STB 4 132, and answering machine 2 134 via link 127. Network interface module 128 is coupled to the communications network 106 via link 129.

Communications network 106 is, e.g., a system provider network such as a cable network. Communications network 106 couples devices located at users premises to head end 108. Head end 108 includes a server node 136, .e.g., an authentication and routing node, a configuration/authentication node 138, and additional servers 140, which are coupled together. The additional servers include, e.g., application servers such as a video on demand (VOD) sever and/or a broadcast server providing content for standard cable channels.

Control information, e.g., information including a command, from a control device such as control device 1 110, intended to control a controllable device situated at its location, e.g., intended to control STB 1 116, is routed through an access point, e.g., WI-FI AP 112, a network interface, e.g., network interface 114, and communications network 106 to server node 136. Server node 136 processes the requested command, e.g., identifying the intended device to be controlled and/or determining whether or not the control device which sent the command is authorized to control the device to which the command is directed. In some embodiments, the server node may also reformat the control information to be conveyed. Assuming that the server node 136 has identified the intended recipient of the command and that server node 136 has validated authorization, the server node 136 sends the command, via communications network 106 and the network interface, e.g., network interface 114 to the intended controllable device, e.g. STB 1 116. The controllable device, e.g., STB 1 116, receives the command and implements the command, e.g., changing a station.

Figure 2:
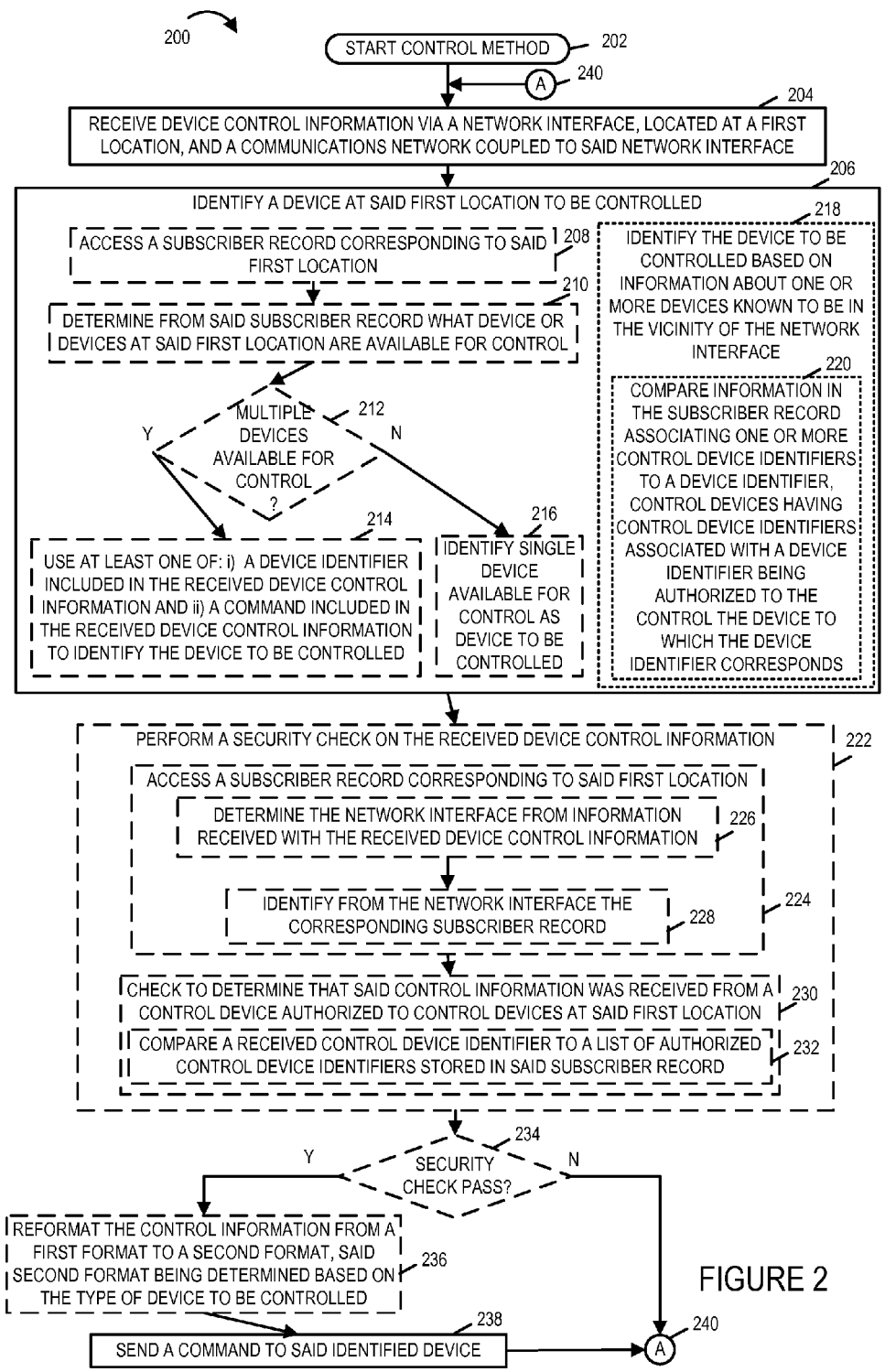
FIG. 2 is a flowchart of an exemplary control method in accordance with an exemplary embodiment.

FIG. 2 is a flowchart 200 of an exemplary control method in accordance with an exemplary embodiment. The exemplary method of flowchart 200 is, in some embodiments, implemented by a single node, e.g., a server node as part of a head end in a cable communications network such as exemplary server node 136 of system 100 of FIG. 1. In some other embodiments, the exemplary method is implemented by a plurality of nodes in a distributed manner, e.g., with some steps of flowchart 200 being implemented by a first node and other steps of flowchart 200 being implemented by a second node. Exemplary flowchart 200 will be described for an exemplary embodiment in which the control method is implemented by a single server node.

Operation of the exemplary control method starts in step 202, where the server node is powered on and initialized. Operation proceeds from start step 202 to step 204. In step 204 the server node receives device information via a network interface, located at a first location, and a communications network coupled to said network interface. The device control information includes, e.g., channel change information, fast forward or other channel/video playback commands. The network interface is, e.g., a cable modem. The communications network is, e.g., a cable network. The first location is, e.g., a customer premise locations such as, e.g., a home, an office or an apartment. In some embodiments, the network interface is coupled to a wireless access point which receives signals from a control device, e.g., a wireless remote control. In some embodiments, the device to be controlled is a set top box which does not include a radio interface and the control device is a WiFi control device which transmits wireless radio signals. Operation proceeds from step 204 to step 206.

In step 206 the server node identifies a device, e.g., a set top box, at said first location to be controlled. In some embodiments, step 206 includes one or more of optional step 208, 210, 212, 214 and 216. In some embodiments, step 206 includes optional step 218.

Returning to step 208, in step 208, the server accesses a subscriber record corresponding to said first location. In some embodiments, accessing a subscriber record includes determining the network interface, e.g., MAC address of the cable modem which is the network interface, from information received with the received device control information and identifying from the network interface the corresponding subscriber record. Operation proceeds from step 208 to step 210. In step 210 the server node determines from said subscriber record what device or devices at said first location are available for control. Operation proceeds from step 210 to step 212. In some embodiments, the subscriber record may, and sometimes does, indicate that there are multiple devices at the first location which can be controlled by the communications network, e.g., a first set top box and a second set top box. In step 212, if the determination of step 210 indicates that multiple devices are available for control, then operation proceeds from step 212 to step 214. However, if the determination of step 210 indicates that a single device is available for control, then operation proceeds from step 212 to step 214.

Returning to step 214, in step 214 the server node uses at least one of: a device identifier included in the received device control information and ii) a command included in the received device control information to identify the device to be controlled. Returning to step 216, in step 216 the server node identifies the single device available for control as the device to be controlled. In one example, the device identifier included in the received device control information is a remote control identifier which is associated in a subscriber record with a particular device, e.g., a particular set top box. In another example, if the command included in the received device control information is a video command, the server identifies that the device to be controlled is a set top box, while if the received command included in the received device control information is a voice mail or message command the server node identifies the device to be controlled as an answering machine implementing a voice mail application and/or message playback functionality.

Returning to step 218, in step 218 the server node identifies the device to be controlled based on information about one or more devices known to be in the vicinity of the network interface. In some embodiments including step 218, step 218 includes step 220. In step 220 the server node compares information in the subscriber record associating one or more control device identifiers to a device identifier, e.g. a set top box identifier, control devices having control device identifiers associated with a device identifier being authorized to control the device to which the device identifier corresponds.

Some embodiments include optional steps 222 and 234. Various embodiments include optional step 236. The exemplary method will be described for an embodiment in which steps 222, 234 and 236 are included. However it should be appreciated at in some embodiments, one or more of steps 222, 234 and 236 may not be included and may be bypassed in the flow.

Returning to step 222, in step 222 the server node performs a security check on the received device control information. Step 222 includes step 224 and 230. In step 224 the server node accesses a subscriber record corresponding to the first location. Steps 224 includes steps 226 and 228. In step 226 the server node determines the network interface from information received with the received device control information, e.g., from a received MAC address of the cable modem which is network interface at location 1. Then in step 228 the server node identifies from the network interface the corresponding subscriber record. Operation proceeds from step 224 to step 230. In step 230 the server node checks to determine that said control information was received from a control device authorized to control devices at said first location. Step 230 includes step 232 in which the server node compares a received control device identifier to a list of authorized control device identifiers stored in said subscriber record. In some embodiments, performing a security check includes comparing received security information, e.g., a received PIN and/or received password, to stored security information in the accessed subscriber record corresponding to the first location. Operation proceeds from step 222 to step 234.

In step 234 the server node tests whether or not the security check of step 222 passed. If the security check of step 222 has passed, then operation proceeds from step 234 to step 236. However, if the security check of step 222 failed, then operation proceeds from step 234 to connecting node A 240.

Returning to step 236, in step 236 the server node reformats the control information from a first format to a second format, said second format being determined based on the type of device to be controlled. In some embodiments, the type of device is one of a plurality of different set top box types, and the second format depends on which type of set top box is being controlled. Operation proceeds from step 236 to step 238. In step 238 the server node sends a command to the identified device. Operation proceeds from step 238 to connecting node A 240. Operation proceeds from connecting node A 240 to step 204, where the server node receives more device control information.

Figure 3:
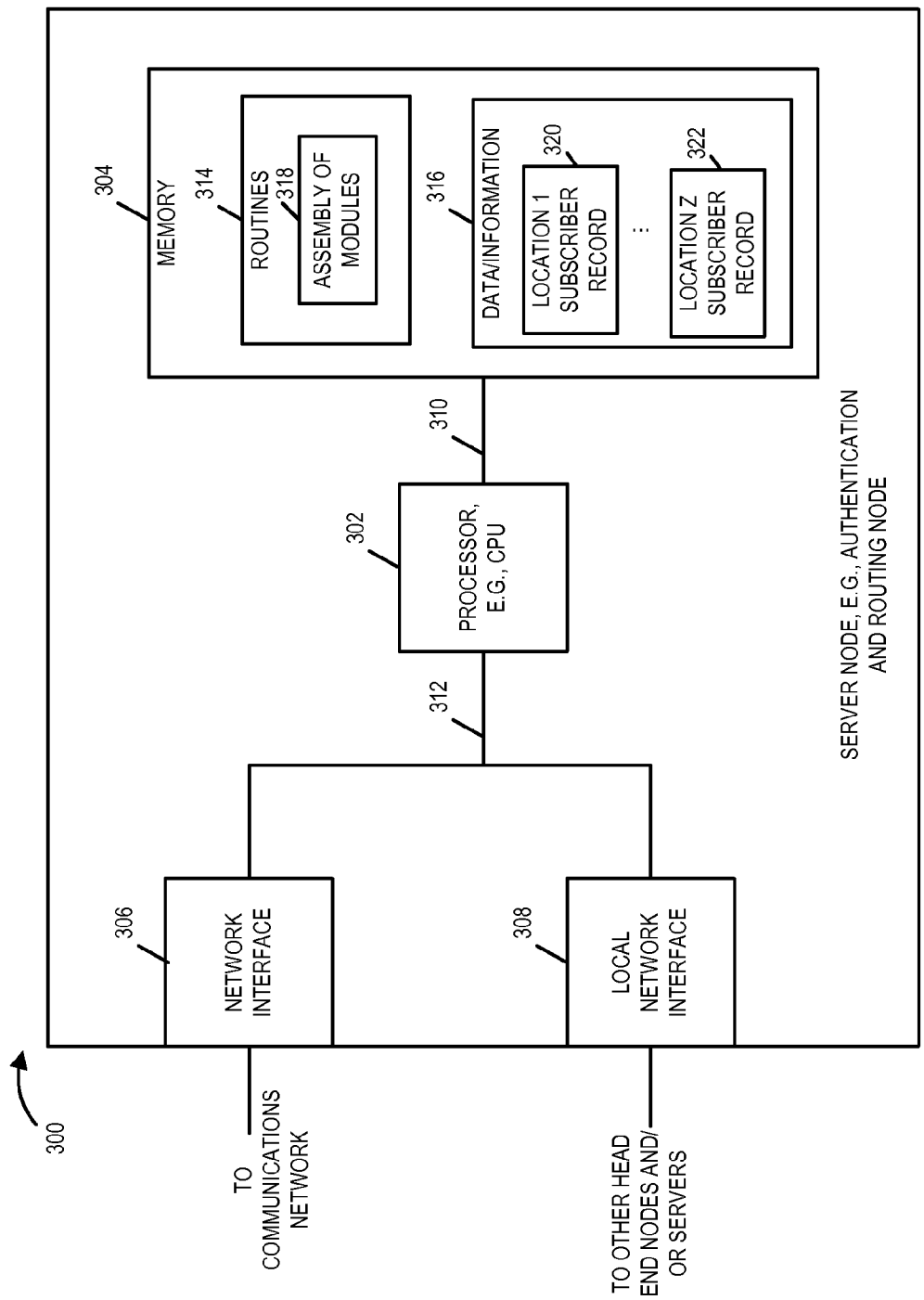
FIG. 3 is a drawing of an exemplary server node, e.g., an exemplary authentication and routing node, implemented in accordance with an exemplary embodiment.

FIG. 3 is a drawing of an exemplary server node 300, e.g., an exemplary authentication and routing node, implemented in accordance with an exemplary embodiment. Exemplary server node 300 is, e.g., exemplary server node 136 included in head end 108 of communications system 100 of FIG. 1. Exemplary server node 300 may implement a control method in accordance with flowchart 200 of FIG. 2. Exemplary server node 300 includes a processor 302, e.g., a CPU, coupled to memory 304 via bus 310. Server node 300 also includes a network interface 306 coupling server node 300 to a communications network, e.g., communications network 106 of FIG. 1, and a local network interface 308 coupling node 300 to other head end nodes and/or servers, e.g. configuration/authorization node 138 and additional servers 140 of FIG. 1.

Memory 304 includes routines 314 and data/information 316. Routines 314 include an assembly of modules 318. The data/information 316 includes a plurality of subscriber records corresponding to different locations (location 1 subscriber record 320, . . . , location Z subscriber record 322). The processor 302, e.g., a CPU, executes routines 314 stored in the memory 314 and, under direction of the routines 314, controls the server node 300 to operate and perform various tasks, e.g., receive a command sent from a control device via a network interface, identify a network interface associated with a geographic location corresponding to the received command, access a subscriber record corresponding to the identified network interface, identify the controllable device to be commanded, verify that the control device which sent the command is authorized to command the controllable device, reformat a command, and/or send an authenticated command to the intended controllable device, etc., in accordance with the invention. To control the server node 300, the processor 302 uses data/information and/or routines 314 including instructions stored in memory 304.

Figure 4:
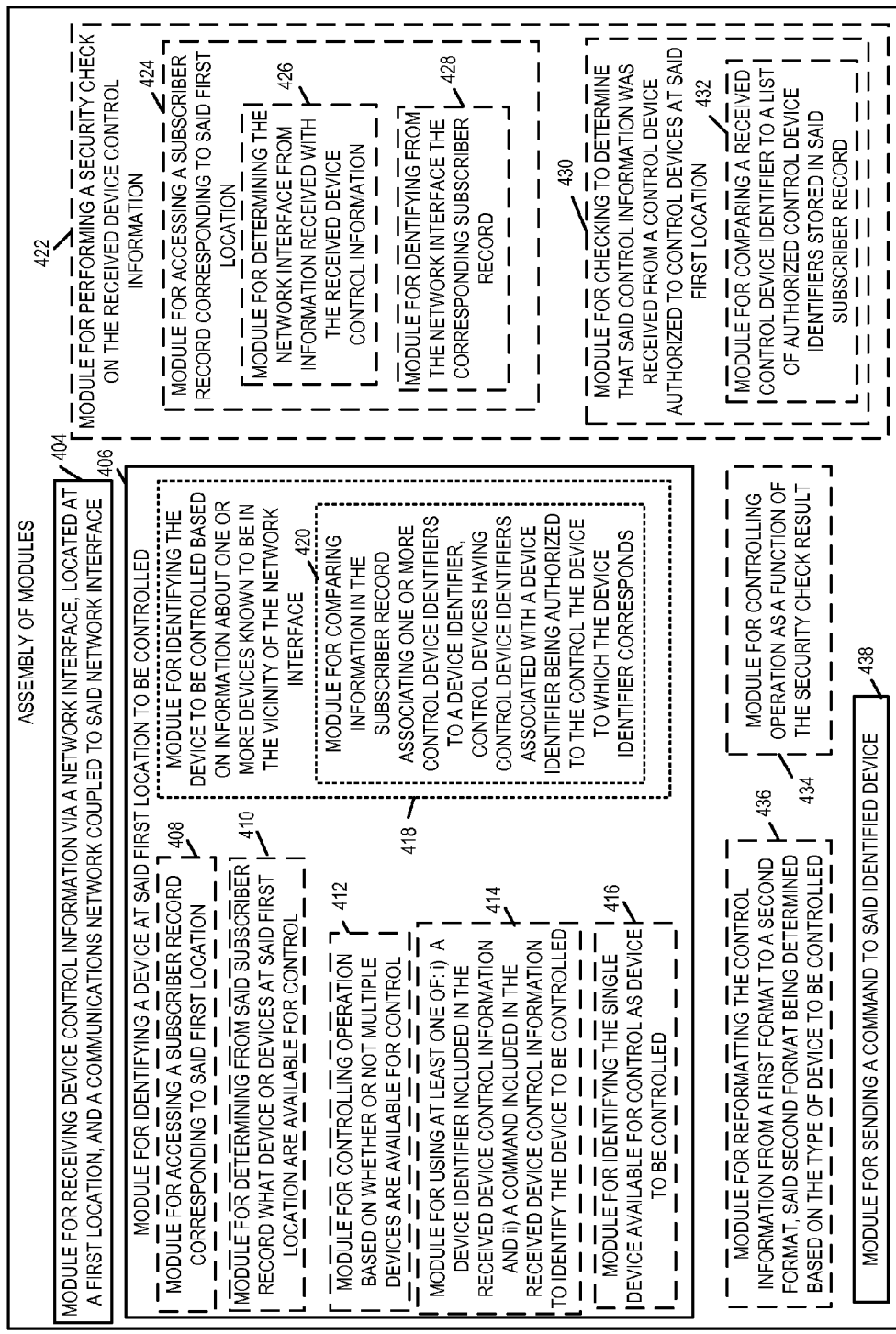
FIG. 4 includes an assembly of modules, which may be included in the exemplary server node of FIG. 3.

FIG. 4 includes an assembly of modules 400, which may be included in the exemplary server node 300 of FIG. 3. In some embodiments the assembly of modules 400 may be stored in memory 304 of server node 300 and executed by processor 302 of server node 300. For example, the assembly of modules 400 may be assembly of modules 318 included in routines 314 of server node 300 of FIG. 3. In some embodiments, the assembly of modules 400 may be implemented as circuitry within processor 302 of server node 300. In various embodiments, some of the modules within assembly of modules 400 may be stored in memory 304 while other modules within assembly of modules 400 may be implemented as circuitry, e.g., within processor 302.

Assembly of modules 400 includes a module 404 for receiving control device information via a network interface, located at a first location, and a communications network coupled to said network interface, a module 406 for identifying a device at said first location to be controlled and a module 438 for sending a command to said identified device. In some embodiments, the network interface is coupled to a wireless access point which receives signals from a control device, e.g., a wireless remote control. In some embodiments, the communications network is a cable network. In one example, the device control information includes a channel change command, a fast forward command or other channel/video playback command, the network interface is a cable modem, the first location is a customer premise location such as a home office or apartment, the communications network is a cable network, and the identified device is a set top box. In some embodiments, the device to be controlled is a set top box which does not include a radio interface and the control device is a Wi-Fi control device which transmits wireless radio signals.

In various embodiments, assembly of modules 400 further includes one or more of: a module 422 for performing, prior to sending the command to the identified device, a security check on the received device control information, a module 434 for controlling operation as a function of the security check result, and a module 436 for reformatting the control information from a first format to second format, said second format being determined based on the type of device to be controlled. In some embodiments, the module 438 for sending a command to said identified device sends said command included in the received device control information to the identified device only when the security check of module 422 is satisfied.

Module 406, in some embodiments, includes one or more of: a module 408 for accessing a subscriber record corresponding to said first location, a module 410 for determining from said subscriber record what device or devices at said first location are available for control, a module 412 for controlling operation based on whether or not multiple devices are available for control, a module 414 for using at least one of i) a device identifier included in the received device control information and ii) a command included in the received device control information to identify the device to be controlled, a module 416 for identifying the single device available for control as the device to be controlled, and a module 418 for identifying the device to be controlled based on information about one or more devices known to be in the vicinity of the network interface.

Module 414, in some embodiments, is controlled to be used when the accessed subscriber record indicates that there are multiple devices at the first location which can be controlled via the communications network. The device identifier included in the received device control information used by module 414 is, e.g., a remote control identifier and the remote control identifier may be associated with a particular device in the subscriber record. The command included in the received device control information used by module 414 is, e.g., a video control type of command in which case module 414 can identify that the device to be controlled is a set top box. Alternatively if the command included in the received device control information used by module 414 is a voice mail message type command module 414 may be able to identify that the device to be controlled is a answering machine device. Module 416, in some embodiments, is controlled to be used when the accessed subscriber record identifies that there is only a single device available to be controlled at the first location via the communications network.

In various embodiments module 408 includes a module for determining the network interface from information received with the received device control information and a module for identifying from the network interface the corresponding subscriber record. In some embodiments, module 418 includes module 420 for comparing the information in the subscriber record associating one or more control device identifiers to a device identifier, e.g., a set top box identifier, control devices having control devices identifiers associated with a device being authorized to control the device to which the device identifier corresponds.

Module 422, in some embodiments, includes one or more of: a module 424 for accessing a subscriber record corresponding to said first location and a module 430 for checking to determine that said control information was received from a control device authorized to control devices at said first location. In some embodiments, including module 424, module 424 includes a module 426 for determining the network interface, e.g., based on the MAC address of the cable modem which is the network interface, from information received with the received device control information and a module 428 for identifying from the network interface the corresponding subscriber record. In some embodiments including module 430, module 430 includes a module 432 for comparing a received control device identifier to a list of authorized control device identifiers stored in said subscriber record.

Figure 5:
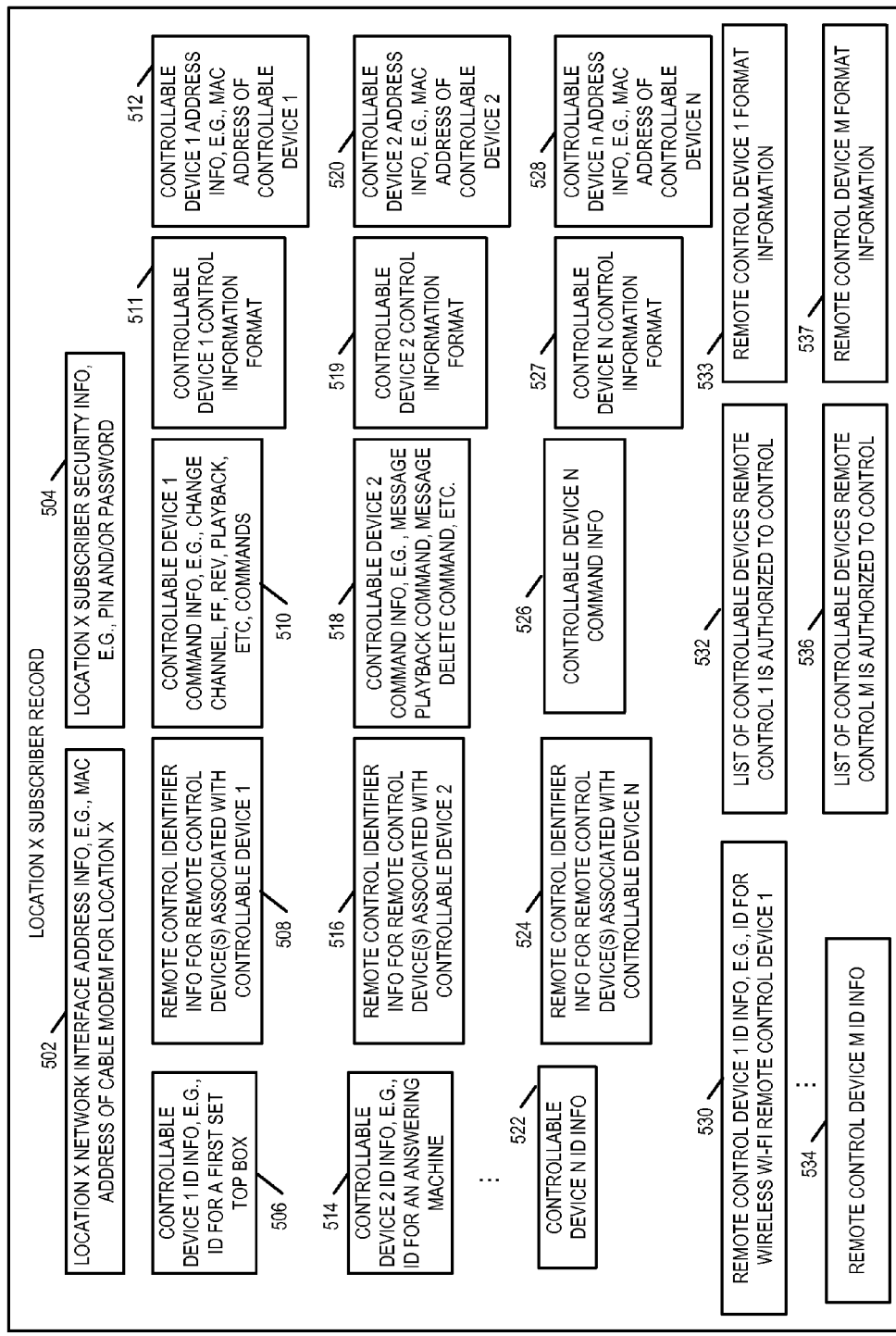
FIG. 5 is a drawing of an exemplary location X subscriber record which may be stored in memory of a server node and accessed as needed.

FIG. 5 is a drawing of an exemplary location X subscriber record 500 which may be stored in memory 304 of server node 300 and accessed as needed. For example, subscriber record 500 is one of the set of subscriber records (location 1 subscriber record 320, . . . , location Z subscriber record 322). In some embodiments, the subscriber record 500 is stored at another node, e.g., another node within the head end and accessed by server node 300 when needed. Location X subscriber record 500 is one of a plurality of subscriber records stored which are available for accessing, e.g., one subscriber record corresponding to each subscriber location.

Exemplary location X subscriber record 500 includes location X network interface address information, e.g., a MAC address of the cable modem for location X, and location X subscriber security information, e.g., a PIN and/or password.

Subscriber record 500 also includes a set of stored information corresponding to each of the controllable devices situated at location X. Corresponding to controllable device 1, subscriber record 500 includes controllable device 1 ID information 506, remote control identifier information for one or more remote control devices associated with controllable device 1 508, controllable device 1 command information 510, controllable device 1 control information format specification information 511 and controllable device 1 address information 512. Controllable device 1 ID information is, e.g., an ID for a first set top box located at location X. Remote control identifier information 508 is, e.g., a list of identifiers identifying one or more wireless remote control devices which are authorized to control controllable device 1. Controllable device 1 command information 510 is, e.g., a list of control commands which may be used to control controllable device 1, e.g., a change channel command, a fast forward command, a reverse command, a playback command, etc. Controllable device 1 control information format specification information 511 includes information used to generate commands to be sent to controllable device 1. In some embodiments, different controllable devices may used different command formats. For example, a first type of set top box, e.g., version 1, may use a first format, and a second type of set top box, e.g., version 2, may use a second format, where the first and second formats are different. In various embodiments, the command format used by a remote control may be, and sometimes is, different from the command format used by a remotely controllable device. Controllable device 1 address information 512 is, e.g., the MAC address of controllable device 2.

Corresponding to controllable device 2, subscriber record 500 includes controllable device 2 ID information 514, remote control identifier information for one or more remote control devices associated with controllable device 2 516, controllable device 2 command information 518, controllable device 2 control information format specification information 519 and controllable device 2 address information 520. Controllable device 2 ID information is, e.g., an ID for an answering machine located at location X. Remote control identifier information 516 is, e.g., a list of identifiers identifying one or more wireless remote control devices which are authorized to control controllable device 2. Controllable device 2 command information 518 is, e.g., a list of control commands which may be used to control controllable device 2, e.g., a message playback command, a message delete command, etc. Controllable device 2 control information format specification information 511 includes information used to generate commands to be sent to controllable device 2. Controllable device 2 address information 512 is, e.g., the MAC address of controllable device 1.

Corresponding to controllable device N, subscriber record 500 includes controllable device N ID information 522, remote control identifier information for one or more remote control devices associated with controllable device N 524, controllable device N command information 526, controllable device N control information format specification information 527 and controllable device N address information 528. Remote control identifier information 524 is, e.g., a list of identifiers identifying one or more wireless remote control devices which are authorized to control controllable device N. Controllable device N command information 526 is, e.g., a list of control commands which may be used to control controllable device N. Controllable device N control information format specification information 527 includes information used to generate commands to be sent to controllable device N. Controllable device N address information 528 is, e.g., the MAC address of controllable device N.

Subscriber record 500 also includes a set of information corresponding to each remotely controllable device authorized to control devices at location X. Corresponding to remote control device 1, subscriber record 500 includes remote control device 1 ID information 530, e.g., an ID for wireless WI-FI remote control device 1, a list of controllable devices remote control device 1 is authorized to control 532 and remote control device 1 format information 533. Corresponding to remote control device M, subscriber record 500 includes remote control device M ID information 534, e.g., an ID for wireless WI-FI remote control device M, a list of controllable devices remote control device M is authorized to control 536 and remote control device M format information 537.

Figure 6:
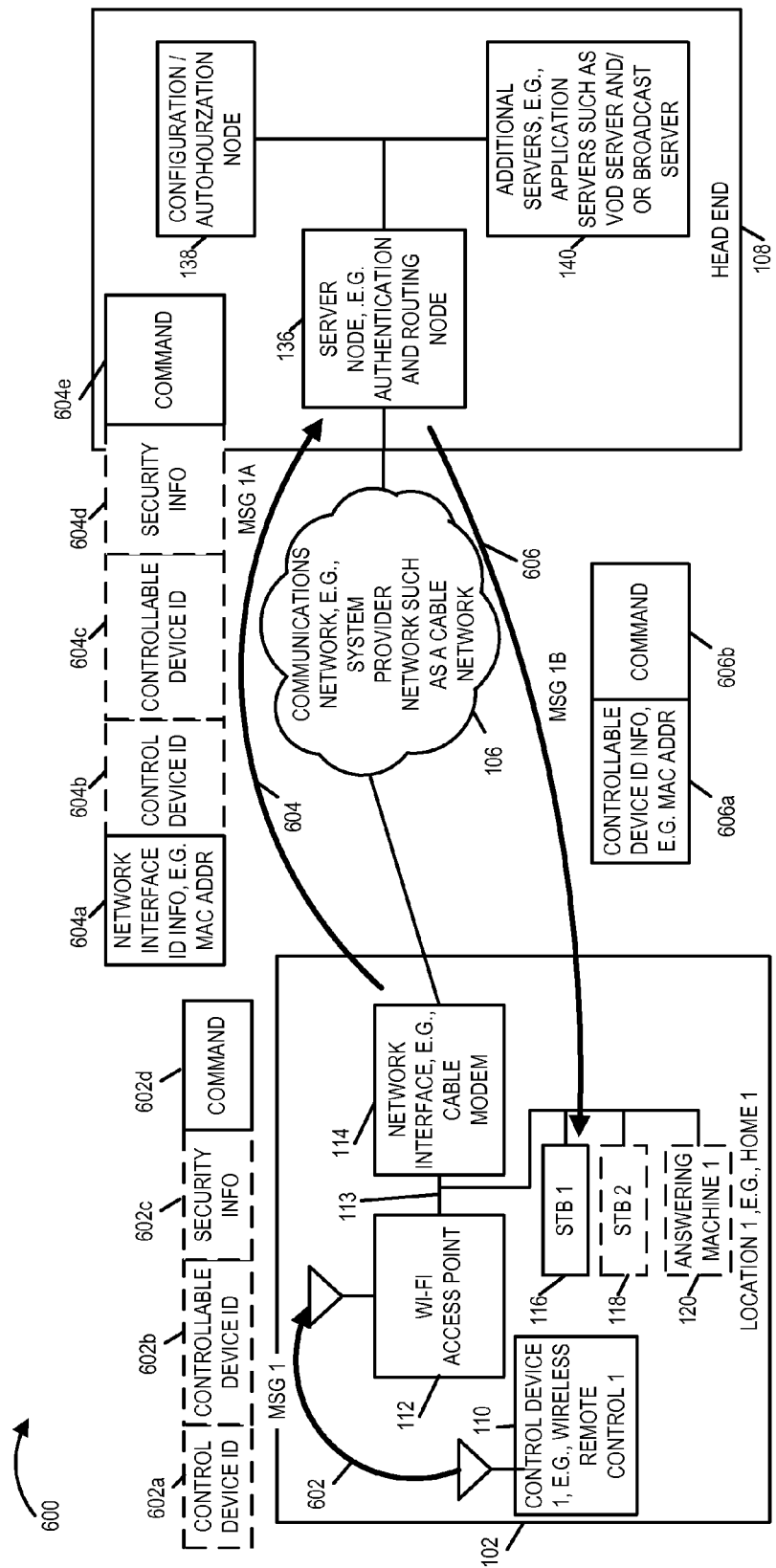
FIG. 6 is an example illustrating exemplary signaling in accordance with an exemplary embodiment.

FIG. 6 is an example illustrating exemplary signaling in accordance with an exemplary embodiment. The exemplary signaling may occur within the context of the exemplary system 100 of FIG. 1.

In the example of FIG. 6, remote control device 110 sends a command to control remotely STB 1 116 which is situated at its location, location 1 102. The command from control device 1 110 is sent to server node 136 in head end 108 via wireless access point 112, network interface 114 and communications network 106. Server node 136 in the head end 108 identifies that STB 1 116 is the device to be controlled and verifies that control device 1 110 is authorized to control STB 1 116. Server node 136, then sends the command to STB 1 116 via communications network 106 and network interface 114. STB 1 116 receives the command and implements the command.

Message 1 signal 602 represents an exemplary signal carrying a command intended to control STB 1 116. Signal 602 include portion 602d and may include one or more of: optional portions 602a, 602b and 602c. In some embodiments, the different potions (602a, 602b, 602c, 602d) correspond to different fields of a message. Control device ID 602a is an identifier corresponding to control device 1 110. Portion 602b conveys a controllable device identifier, e.g., an identifier identifying STB 1 116 uniquely from among each of the devices available for control at location 1 or in the system. In another example, controllable device identifier 602b is, e.g., an identifier identifying STB 1 116 from among a subset of devices available for control at location 1. For example, controllable device ID 602b may be a single bit identifying that the command is intended for STB 1 116 and not for STB 2 118. Security information 602c is, e.g., a PIN and/or password from control device 1, e.g., which had been entered by a user of control device 1, e.g., or which is stored in control device 1 110. Security information 602c is to be compared against stored security information corresponding to the subscriber premise location 1 102 by server node 136 as part of the authorization testing. Command 602d conveys the intended command to be executed by STB1, e.g., a channel change command. In some embodiments, the format of the command 602d is the same as the format used by STB1 116. In some other embodiments, the format of command 602d is based on the control device 110, and the command format is converted by server node 136, e.g., to match the implemented command format of STB 1 116.

Message 1A signal 604 represents a forwarding of message MSG 1 from network interface 1 114 to server node 136 via communications network 106, with appended network interface ID information. Signal 604 includes portion 604a and portion 604e, and may include one or more of optional portions 604b, 604c, and 604d. Portion 604a conveys network interface ID information, e.g., the MAC address corresponding to network interface 114, e.g., the MAC address of the cable mode at location 1 102. Control device ID 604b is, e.g., a copy of control device ID 602a of MSG 1 602. Controllable device ID 604c is, e.g., a copy of controllable device ID 602b of MSG 1 602. Security information 604d is, e.g., a copy of security information 602c. Command 604e is, a copy of command 602c of MSG 1 602.

Server node 136 receives MSG1A signal 604 and uses information included in MSG1 604 and stored information to identify that the device to be controlled is STB 1 116 and that control device 1 110 is authorized to command STB 1. Server node 136, e.g., implements a method in accordance with flowchart 200 of FIG. 2.

Consider that the network interface address information, e.g., information 604a, is used to identify the subscriber record for location 1 102 from among a plurality of stored subscriber records corresponding to different locations. Several different scenarios will now be presented as examples. Consider that location 1 includes only one device of each type, e.g., one set top box and one answering machine. In such a scenario the server node may be able to identify the intended recipient of the command from the type of received command in 604e, e.g., different commands are used for STBs and answering machines. Consider that each remotely controllable device at location 1 is paired with its own remote control device. In such a scenario a control device ID included in control device ID 604b may enable the server node to identify the intended recipient of the received command and/or verify that the control device which sent the command is authorized to command the intended recipient. In some embodiments, security information input to and/or included in a remote control device, which is received in security info 604d is used in the identification and/or verification.

Consider that location 1 includes two STBs which use the same command set. In one embodiment, a controllable device ID 604c, e.g., a single bit, may be used to distinguish which of the two STBs is the intended recipient of the command.

Numerous variations are possible in accordance with the present invention, e.g., depending upon the implementation, number and/or type of remote control devices, and/or number and/or type of remotely controllable devices at a location. In some embodiments, at some sites some remotely controllable devices may be authorized and/or enabled to be controlled in accordance with a method of flowchart 200 of FIG. 2, while other remotely controllable devices may not be authorized and/or enabled to be controlled in accordance with a method of flowchart 200 of FIG. 2. In some embodiments, at least one user premise location in a communications system may be authorized and/or configured to allow control of at least one remotely controllable device in accordance with a method of flowchart 200 of FIG. 2, while at least one other user location in the system does not include any devices authorized and/or configured to be controlled in accordance with the method of flowchart 200 of FIG. 2.

Returning to the example of FIG. 6, server node 136 generates and sends message MSG1B signal 606 to STB 1 116. MSG1B 606 includes controllable device ID information 606a, e.g., the MAC address for STB1, and command 606b, e.g., a copy of command 604e of MSG1A 604 or a reformatted command corresponding the command 604e of MSG1A 604. MSG1B 606 is routed through communications network 106, network interface 114 and link 113 to STB 1 116, which receives and implements the command conveyed in 606b.

In some embodiments, one of more of MSG1 606, MSG1A 604 and MSG1B 608 may be conveyed via a plurality signals.

The techniques of the present invention may be implemented using software, hardware and/or a combination of software and hardware. In the case of software, computer executable instructions used to control a processor may be stored in memory or another storage device and then executed by a processor. The present invention is directed to apparatus, e.g., communications devices such as telephones, servers, and/or other communications system elements which implement all or a portion of the present invention. It is also directed to methods, e.g., method of controlling and/or operating communication system elements to implement one or more portions of the methods of the invention. The present invention is also directed to machine readable medium, e.g., ROM, RAM, CDs, hard discs, etc., which include machine readable instructions for controlling a machine to implement one or more steps in accordance with the present invention.

While a single server node, e.g., server node 136 of FIG. 1 and FIG. 6 or server node 300 of FIG. 4, is described as implementing an exemplary method, e.g., the method of flowchart 200 of FIG. 2, it should be appreciated that the functionality of the sever node may be distributed among a plurality of nodes. For example, a plurality of nodes within a head end, which are included as part of an authentication and routing system, may, in combination, implement a method in accordance with the present invention. Thus it should be appreciated that the level of integration and number of functions performed by the individual devices used to implement the method may vary depending on the particular network implementation.

In various embodiments system elements described herein are implemented using one or more modules to perform the steps corresponding to one or more methods of the present invention, for example, communication detection, communication disposition, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

The methods and apparatus of the present invention, are applicable to and can be used with a one or a combination of systems including cable systems, PSTN systems, cellular systems, etc.

Numerous additional variations of the methods and apparatus of the present invention described above will be apparent to those skilled in the art in view of the above description of the invention. Such variations are to be considered within the scope of the invention.

What is claimed is:

1. A control method, the method comprising:
receiving, at a wireless access point located in a customer premise, a first command from a control device;
sending the first command to a second location via a network interface, said network interface being coupled to said wireless access point which receives signals from the control device;
receiving, at the second location, device control information including said first command, said device control information being communicated to said second location via the network interface and a communications network coupled to said network interface, said network interface being located at a first location which is the customer premise, said second location being outside said customer premise, said first command being a command for controlling a device at said first location;
identifying the device at said first location to be controlled; and
sending a second command to said identified device, said second command being a copy of said first command or a reformatted version of said first command.

2. The method of claim 1,
wherein identifying the device includes:
accessing a subscriber record corresponding to said first location; and
determining from said subscriber record what device or devices at said first location are available for control.

3. The method of claim 2, wherein when said subscriber record indicates there are multiple devices at said first location which can be controlled via said communications network, said step of identifying said device to be controlled includes identifying said device to be controlled based on what type of command said first command is.

4. The method of claim 2, further comprising, prior to sending the second command to said identified device,
performing a security check on the received device control information; and
wherein said first command included in the received device control information is sent to the identified device only when the security check is satisfied.

5. The method of claim 1, wherein identifying the device at said first location to be controlled includes:
identifying a first device as said device to be controlled when said first command is a voice mail or message command; and
identifying a second device as said device to be controlled when said first command is a video command, said first and second devices being different devices.

6. The method of claim 1,
wherein identifying the device to be controlled includes identifying the device based on information about one or more devices known to be in the vicinity of the network interface at said customer premise.

7. The method of claim 4, wherein performing a security check includes:
accessing a subscriber record corresponding to said first location; and checking information in said subscriber record identifying control devices corresponding to said first location to determine that said control information was received from a control device authorized to control devices at said first location.

8. The method of claim 1,
wherein said device control information including the first command is received at a second device prior to the sending of the second command to said identified device; and
wherein said step of sending the second command to said identified device is performed by a device outside said customer premise.

9. The method of claim 7, wherein checking to determine that said control information was received from a control device authorized to control devices at said first location includes comparing a received control device identifier to a list of authorized control device identifiers stored in said subscriber record.

10. The method of claim 6,
wherein identifying the device to be controlled from information about one or more devices known to be in the vicinity of the network interface includes:
comparing information in a subscriber record associating one or more control device identifiers to a device identifier, control devices having control identifiers associated with a device identifier being authorized to control the device to which the device identifier corresponds.

11. The method of claim 1,
wherein the device to be controlled does not include a radio interface; and
wherein said device control information is received from a WiFi control device which transmits WiFi wireless radio signals.

12. The method of claim 10, further comprising:
reformatting the control information from a first format to a second format, said second format being determined based on the type of device being controlled.

13. The method of claim 12, wherein the type of device is one of a plurality of different set top box types, the second format depending on which type of set top box is being controlled.

14. A system comprising:
a wireless access point located at a first location configured to receive signals from a control device, said first location being a customer premise;
a network interface coupled to said wireless access point;
a server located at a second location, said server including a processor which controls said server to:
receive device control information including a first command via the network interface and a communications network coupled to said network interface, said network interface being located at the first location, said second location being outside said customer premise, said first command being a command for controlling a device at said first location;
identify the device at said first location to be controlled; and
send a second command to said identified device, said second command being a copy of said first command or a reformatted version of said first command.

15. The system of claim 14, wherein said processor is further configured to control said server to:
access a subscriber record corresponding to said first location; and
determine from said subscriber record what device or devices at said first location are available for control.

16. The system of claim 15, wherein said processor is further configured to control said server to:
use, when said subscriber record indicates there are multiple devices at said first location which can be controlled via said communications network, said first command included in the received device control information to identify said device to be controlled based on what type of command said first command is.

17. The system of claim 15, wherein the server further includes:
a security checking element for performing, prior to sending the command to said identified device, a security check on the received device control information.

18. The system of claim 15,
wherein said network interface is a cable modem.

19. The system of claim 14,
wherein said communications network is a network coupling said customer premise to said server; and
wherein said processor is further configured to control said server to:
identify the device based on information about one or more devices known to be in the vicinity of the network interface.

* * * * *